Aug. 28, 1962 T. BUDZICH 3,051,093
VALVE PLATE FOR ENGINE
Filed Aug. 12, 1957 4 Sheets-Sheet 1

INVENTOR
Tadeusz Budzich

BY Dodge and Sons
ATTORNEYS

Aug. 28, 1962     T. BUDZICH     3,051,093
VALVE PLATE FOR ENGINE
Filed Aug. 12, 1957     4 Sheets-Sheet 2
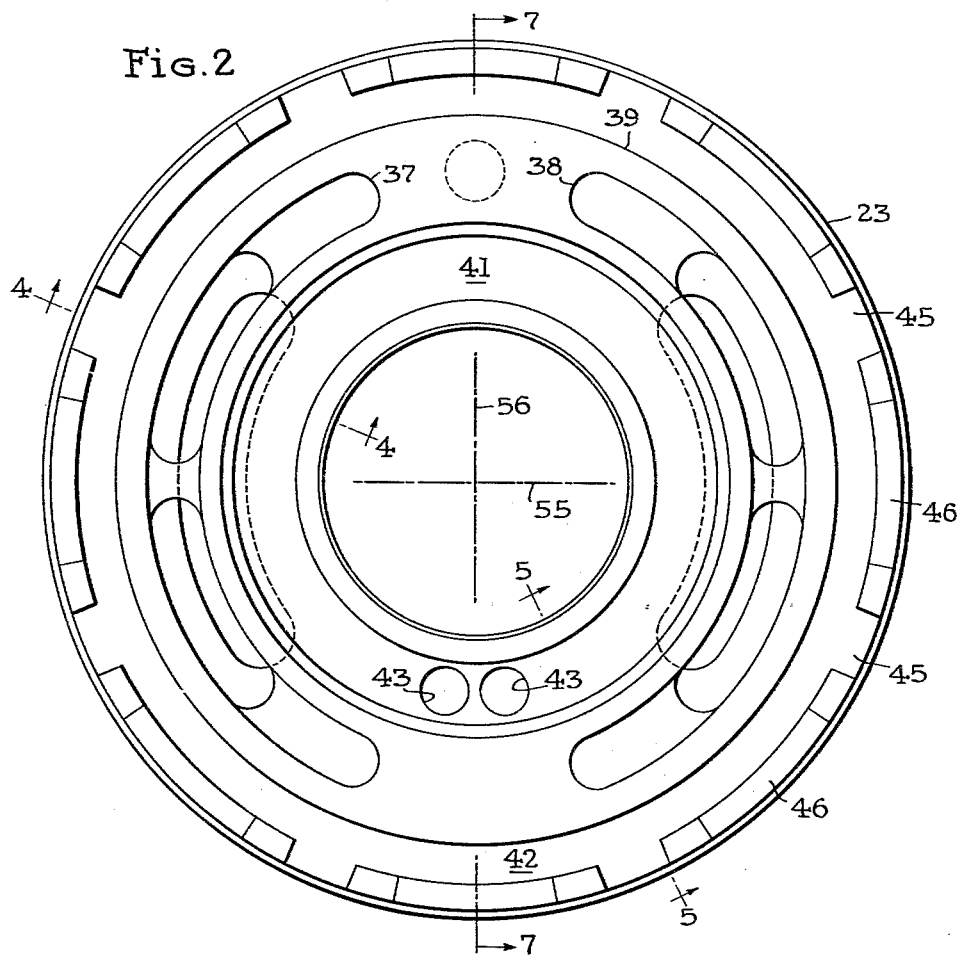
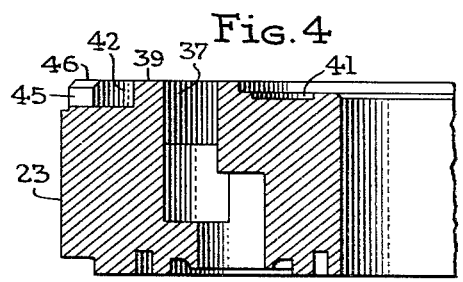
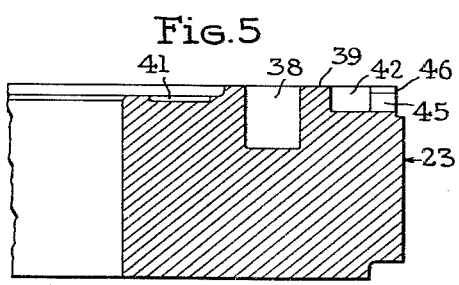
INVENTOR
Tadeusz Budzich
BY Dodge and Sons
ATTORNEYS Aug. 28, 1962 — T. BUDZICH — 3,051,093
VALVE PLATE FOR ENGINE
Filed Aug. 12, 1957 — 4 Sheets-Sheet 3

INVENTOR
Tadeusz Budzich
BY Dodge and Sons
ATTORNEYS

Aug. 28, 1962 T. BUDZICH 3,051,093
VALVE PLATE FOR ENGINE
Filed Aug. 12, 1957 4 Sheets-Sheet 4

INVENTOR
Tadeusz Budzich
BY Dodge and Sons
ATTORNEYS

United States Patent Office 3,051,093
Patented Aug. 28, 1962

3,051,093
VALVE PLATE FOR ENGINE
Tadeusz Budzich, Watertown, N.Y., assignor to The New York Air Brake Company, a corporation of New Jersey
Filed Aug. 12, 1957, Ser. No. 677,636
2 Claims. (Cl. 103—162)

This invention relates to fluid pressure engines and more particularly to engines of the rotary cylinder barrel type. As used herein, the term engine means a device which can operate either as a pump or a motor.

Engines of this type commonly include a rotary cylinder barrel mounted freely for movement in the longitudinal direction, a circumferential series of longitudinal cylinder bores extending through the barrel, a housing wall parallel with one end face of the cylinder barrel and containing high and low pressure ports, and a valve plate having front and rear faces in abutment with the end face of the cylinder barrel and the housing wall, respectively, and being bolted to the housing or tightly pressed in a bore formed therein. The front face of the valve plate contains diametrically opposed arcuate high and low pressure ports which communicate through the valve plate with the housing ports and which are arranged to register sequentially with each cylinder bore as the barrel rotates. The fact that these engines operate at pressures as high as 3,000 p.s.i. gives rise to a serious leakage problem at the mating faces of the cylinder barrel and valve plate. The usual way of sealing these surfaces consists in providing a radially extending reaction surface within each cylinder bore so that the pressure in those bores connected to the high pressure port will exert a contact maintaining force on this surface urging the cylinder barrel into contact with the valve plate. This force is resisted by a high pressure fluid film established between the cylinder barrel and the valve plate and dimensioned so that the fluid pressure reaction force is slightly less than the contact maintaining force. In this way, the small difference between two large forces will maintain the cylinder barrel and valve plate in abutment.

The contact maintaining force from the cylinder barrel is transmitted through the valve plate to the housing, causing deflection of both the valve plate and the housing. Since this force acts only on the high pressure side of the valve plate and since the housing supporting the wall is rarely, if ever, structurally symmetrical, the wall does not deflect uniformly in the longitudinal direction but becomes an irregular curved surface producing gaps between the valve plate and the wall. If the valve plate does not follow this deflection, leakage will occur between these two members. On the other hand, if the valve plate does deflect to close these gaps, similar ones will be produced between the cylinder barrel and the valve plate and intolerable leakage will occur across the front face of the valve plate. The usual solution to this problem is to employ a housing thick enough and strong enough to resist appreciable deflection. However, this brute force approach suffers one great disadvantage—it results in a heavy engine, and in environments where weight is critical, the solution is not satisfactory.

The object of this invention is to provide a valve plate for use in engines of the type mentioned which does not rely on housing strength to insure satisfactory fluid seals around the high pressure ports on its front and rear faces. Basically, the invention consists in mounting the valve plate between the cylinder barrel and the housing for unrestrained movement in the longitudinal direction and in encircling the high pressure port on the rear face of the valve plate with a resilient O-ring. The outer margin of the O-ring defines a pressure area on which the fluid passing through the port can act to afford an hydraulic support for the valve plate. The size of the pressure area is so chosen that the force acting thereon is less than the contacting force. In this way, the O-ring will be compressed between the valve plate and the housing wall. When the housing deflects, the O-ring will expand to maintain sealing contact and, as a result, the valve plate need not deflect but can remain in sealing engagement with the cylinder barrel. Since the fluid seals on both faces of the valve plate are now independent of housing deflections, the housing can be made from materials having low moduli of elasticity and the thickness of its walls can be reduced.

In addition to its function of insulating the valve plate from the deflections of the housing, the pressure area on the rear face of the valve plate also serves to produce moments counteracting the bending moments caused by the high pressure fluid film on the front face of the valve plate. By properly sizing, shaping and locating the rear pressure area, the optimum compromise between flow restriction at the rear port and bending moment can be adopted. In this way, the mass of the valve plate itself can be reduced without adversely affecting its performance.

A further feature of the invention relates to a valve plate design which insures that the optimum compromise mentioned above can be availed of regardless of the nature of the housing deflection.

The preferred embodiment of the invention will now be described in relation to the accompanying drawings, in which:

FIG. 2 is a view of the front face of the valve plate.

FIG. 4 is a sectional view taken on line 4—4 of FIG. 2.

FIG. 5 is a sectional view taken on line 5—5 of FIG. 2.

While the invention is useful in pumps and motors, it will be described in relation to an engine serving in the former capacity.

Figure 1:
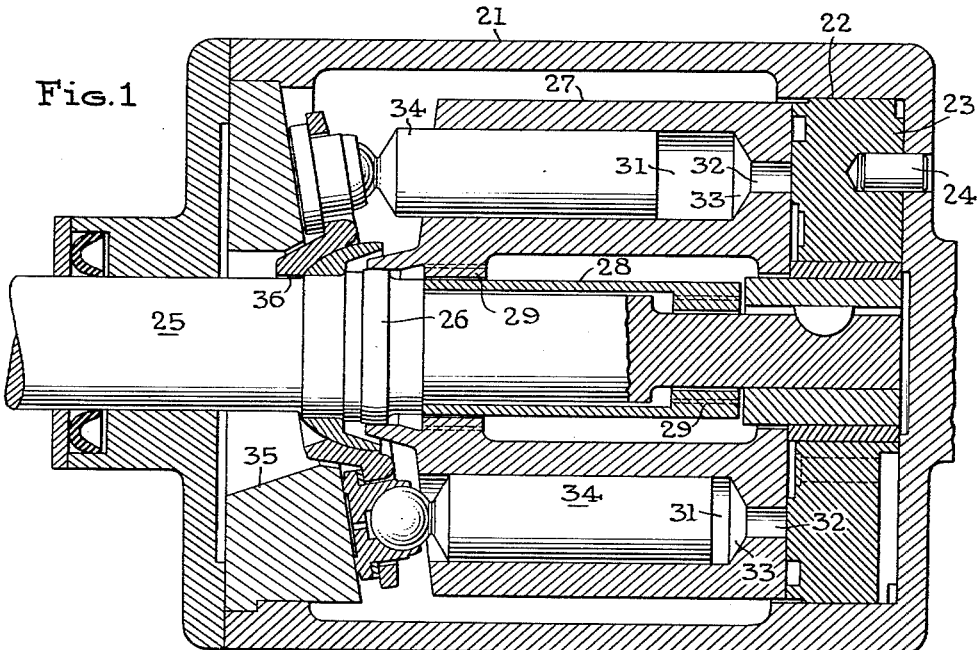
FIG. 1 is an axial section of a simplified rotary cylinder barrel engine showing a typical application of the improved valve plate.

Referring to FIG. 1, the pump employing the preferred form of the invention comprises a housing 21 having a bore 22 at its right end for receiving a valve plate 23. The valve plate is slidable in bore 22 and is constrained against rotation by pin 24. A drive shaft 25, carrying spherical enlargement 26 for supporting a cylinder barrel 27, is journalled in the housing 21 and in valve plate 23 and is connected in driving relation with the cylinder barrel by torque tube 28 and splines 29. The cylinder barrel 27 is formed with a circumferential series of longitudinal cylinder bores 31 which communicate with the ports of valve plate 23, described below, through restricted ports 32. The intersection of port 32 and bore 31 defines a reaction surface 33 against which the fluid pressure in the bore acts to urge the cylinder barrel 27 into contact with the valve plate. Pistons 34 are mounted in cylinder bores 31 for reciprocation by cam plate 35 and nutating plate 36 in a well known manner.

As shown in FIG. 2, the front face of the valve plate 23 contains diametrically opposed inlet and discharge ports 37 and 38 which are located in an annular land 39 and are arranged to register sequentially with each of the restricted ports 32 as the cylinder barrel rotates. Surrounding the land 39 are two concentric annular leakage grooves 41 and 42 which serve to limit the area on which the fluid leaking from discharge port 38 can act. The inner groove 41 communicates with the interior of the pump housing via passages 43 and 44 and the outer groove is connected with this same space via radial passages 45 separating the conventional dynamic pads 46.

The hydraulic pressure in those cylinder bores registering with discharge port 38, acts against reaction surfaces 33 to develop a contact maintaining force which urges the cylinder barrel 27 into abutment with the valve plate 23. Part of this force is transmitted to the valve plate by the fluid pressure gradient acting on land 39 and the balance is transmitted through the dynamic oil film existing between the cylinder barrel and dynamic pads 46. The land 39 is so dimensioned that the dynamic pads carry only 3% to 5% of the contact maintaining force. This arrangement has been employed frequently in the prior art so further description is unnecessary.

Figure 6:
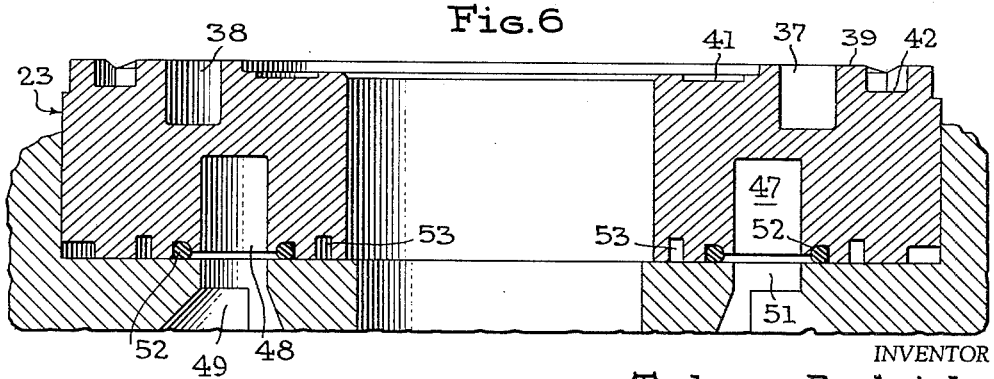
FIG. 6 is a sectional view taken on line 6—6 of FIG. 3 and includes a portion of the housing to show the relationship between the valve plate ports and the housing ports.

The rear face of the valve plate 23 contains diametrically opposed arcuate ports 47 and 48 which communicate respectively with inlet and discharge ports 37 and 38 on the front face and which register with corresponding ports 49 and 51 formed in housing 21 (see FIG. 6). Surrounding the ports 47 and 48 are similarly shaped O-rings 52 and leakage grooves 53. The grooves 53 are connected with the interior of the housing by radial passages 54 and are provided as a safety measure to limit the area over which the fluid from the discharge port 48 could act in the event O-ring 52 failed. Since the pump is reversible, an O-ring and a leakage groove are provided for each of the ports 47 and 48.

During operation, discharge fluid passing through the valve plate acts on the pressure area enclosed by the outer margin of O-ring 52 surrounding port 48, producing a force which urges the valve plate away from the housing. In order to fully understand the invention, it is necessary to examine the factors influencing the design of this pressure area and the effect of the force acting thereon. Considering first the size of this area, it might appear that distortion of the valve plate could be minimized most effectively by making the area of port 38 and its surrounding land 39 equal to the area of port 48 and O-ring 52. However, such an arrangement would be unsatisfactory because it would cause the valve plate and housing to separate, thereby producing leakage between these members. This is attributable to the fact that the O-ring 52 is subjected to the full pressure in port 48, whereas the land 39 is subjected to a pressure gradient which varies from a maximum adjacent port 38 to zero in leakage grooves 41 and 42. Therefore, if the areas were equal, the force acting on the rear pressure area would be considerably greater than the contacting force, and the valve plate and cylinder barrel would move away from the housing. In order to avoid this effect, it is necessary to reduce the area enclosed by the outer margin of O-ring 52 so that the force acting on the rear pressure area will be less than the contact maintaining force. Since the minimum diameter of an O-ring capable of sealing a pressure of 3,000 p.s.i. is limited, the only way to reduce this area is to reduce the size of port 48. Here, a compromise arises because if the radial width of the port is decreased the flow of discharge fluid will be restricted, and if the angular length is decreased the load distributions on the front and rear faces of the valve plate will be asymmetrical. As a result of compromising, a port 48 is evolved which is wider but shorter than port 38 and which has an area such as to produce a force which is smaller than the contacting force.

Figure 3:
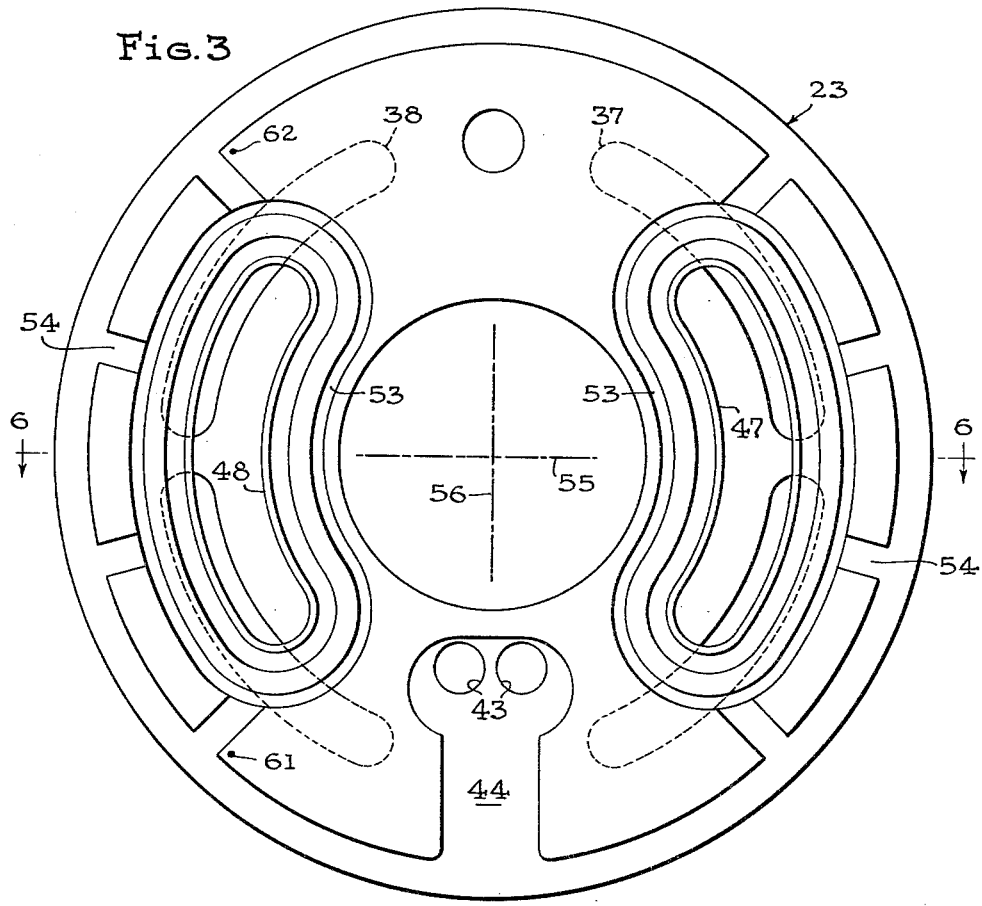
FIG. 3 is a view of the rear face of the valve plate.

The location of the port 48 is another important factor in the design of the valve plate. Referring to FIGS. 2 and 3, it can be seen that the port 48 is symmetrical about the axis 55 bisecting the front port 38. This arrangement serves to minimize the bending moment about axis 55 and thus reduce the deflection of the valve plate in a direction parallel with axis 56 (extending in a direction normal to axis 55). It can also be seen that the rear port 48 is located radially inward of front port 38. The reason for this is the fact that since the port 48 is shorter in angular extent, its center of pressure would be located radially outward of the center of pressure of port 38 if the two ports were aligned. Since alignment of the centers of pressure results in a minimum bending moment about axis 56, and consequently minimum deflection of the valve plate in a direction parallel with axis 55, the rear port must be located radially inward of the front port to compensate for the radial misalignment of the centers of pressure.

Figure 7:
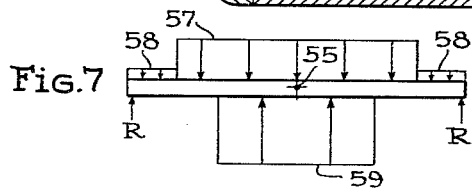
FIGS. 7–11 are diagrams of various loading arrangements and exaggerated sketches of the valve plate deflections produced thereby; the valve plate being viewed on line 7—7 of FIG. 2.
Figure 8:
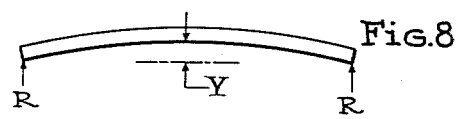

Turning now to a consideration of the load distributions on the two faces of the valve plate, reference is made to FIGS. 7–11. In all of these figures, the valve plate appears as a simply supported beam lying along axis 56. In other words, the figures are diagrammatic sectional views taken on line 7—7 of FIG. 2, it being assumed that the radial clearance between bore 22 and the outer periphery of valve plate 23 is such that no end moments are applied to the valve plate. In FIG. 7, 57 represents the loading on port 38 and land 39, 58 represents the loading on dynamic pads 46, and 59 represents the loading on port 48 and O-ring 52. Since the force represented by loading 59 has been stated to be less than the contact maintaining force, represented by the sum of loadings 57 and 58, the reaction forces (R), equal to the difference between these two forces, must be applied to place the valve plate in equilibrium. These forces (R) are developed by direct contact between the valve plate and the housing and it is assumed that the housing deflects in such a way that this contact occurs at the opposite ends of axis 56. In the FIG. 7 example, the reactions (R) are very small, i.e., the force developed by the pressure area on the rear face is just slightly less than the contact maintaining force. Under this loading, the valve plate will deflect in the manner shown in FIG. 8; and it will be obvious that such deflection will produce large gaps between the cylinder barrel and valve plate.

Figure 9:
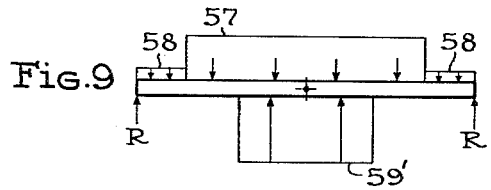
Figure 10:
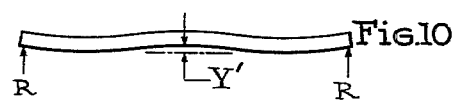

In the example of FIG. 9, the angular extent of port 48 has been reduced and as a result the force represented by the loading 59' is smaller than the force represented by loading 59 in FIG. 7. Therefore, in this example the reactions (R) are much larger. Since the moment of these reactions about axis 55 opposes the moment due to loadings 57 and 58, it is apparent that the bending moment at axis 55 becomes smaller as the reactions (R) become larger. The deflection produced by the FIG. 9 loadings is shown in FIG. 10, and it can be seen that as a result of this reduction in bending moment, the maximum deflection (Y') is less than the maximum deflection (Y) in FIG. 8. If the leakage produced by the FIG. 7 loading is excessive and that produced by the FIG. 9 loading is not excessive, then it is obvious that regulation of the bending moment has converted an inoperative structure into an operative one. On the other hand, if both loadings produce excessive leakage, it will be equally obvious that the additional mass which must be added to the valve plate to counteract the deflection (Y') will be less than the mass required to counteract the deflection (Y). It should be pointed out that the loading 59 cannot be reduced indiscriminately because such reductions are accomplished only at the expense of further restricting the flow through port 48. Furthermore, if the loading 59 is decreased and reactions (R) increased beyond the point where the bending moment at axis 55 is zero, further such changes will cause the bending moment to increase progressively in the opposite direction. In a typical pump of this type, a workable compromise between weight and flow restriction is effected when the force represented by loading 59' is about 10% less than the contact maintaining force.

Up to this point, it has been assumed that the reactions (R) are applied at the opposite ends of axis 56. However, in some pumps, due to the asymmetry of the housing structure, the end wall may deflect in such a way that it contacts the valve plate at points which are nearer axis 55, such as the points 61 and 62 in FIG. 3. When this happens, the moments of the reaction forces about axis 55 become smaller and as a result the bending moment and consequently the deflection at axis 55 becomes larger. If the contact points move inward too far, the valve plate will deflect in the manner shown in FIG. 11, and discharge fluid will leak across its front face. To avoid this effect, the reactions (R) could be increased to again reduce the deflection to an acceptable value but this can be done only by sacrificing the flow area of port 48. A more satisfactory solution is incorporated in the embodiment of FIG. 12.

Figure 13:
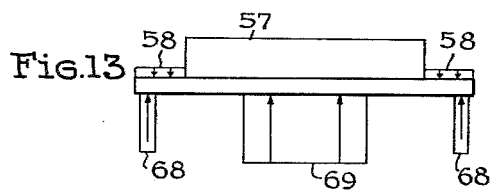
FIGS. 13 and 14 are loading and deflection diagrams, respectively, for the modified valve plate of FIG. 12.
Figure 11:
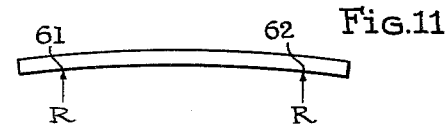
Figure 12:
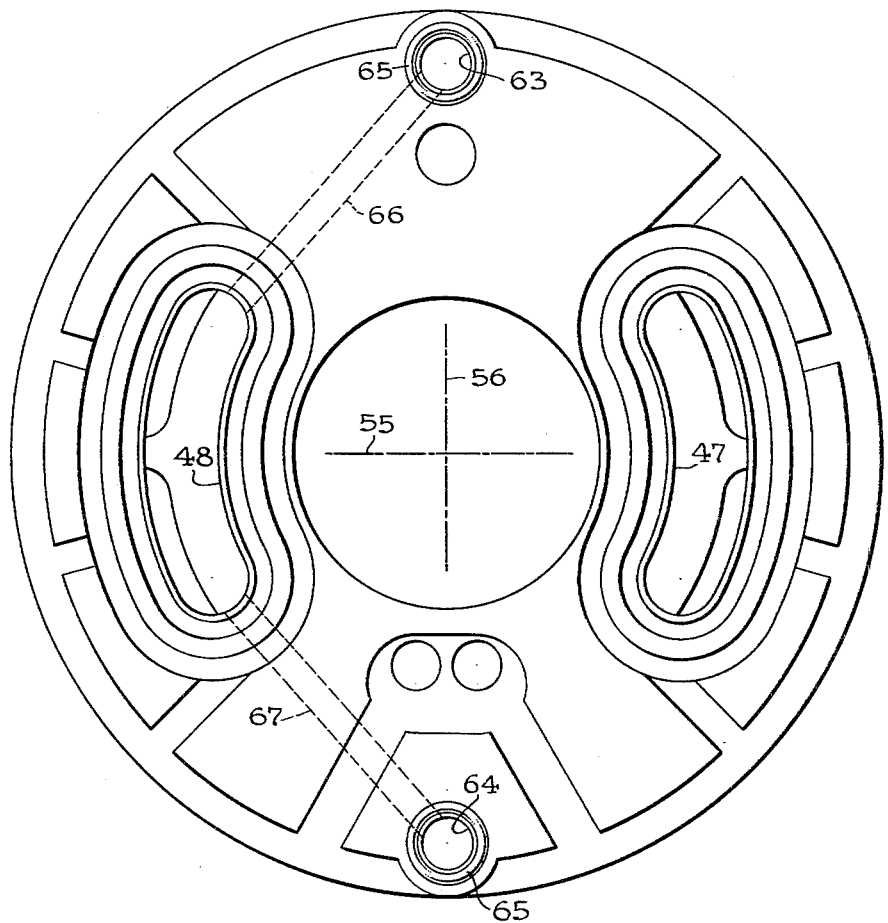
FIG. 12 is a view of the rear face of the valve plate showing a modified version of the preferred embodiment.

Referring to FIG. 12, the rear face of the valve plate 23 contains two circular recesses 63 and 64 located on axis 56 adjacent the outer periphery of the valve plate. These recesses are surrounded by resilient O-rings 65 and are connected with the port 48 by passages 66 and 67 respectively. Pressure fluid transmitted to the recesses acts on the auxiliary areas enclosed by the outer margins of O-ring 65 to produce the auxiliary hydraulic loads 68, shown in FIG. 13. The area enclosed by the O-rings is so designed that the sum of the forces represented by the auxiliary loadings 68 and the main loading 69 (acting on port 48 and O-ring 52) is less than the contact maintaining force. In practice, this sum is about 90% to 95% of the contact maintaining force. Therefore, for all practical purposes, the valve plate is supported solely by the hydraulic loads acting on the O-ring encircled areas.

Figure 14:
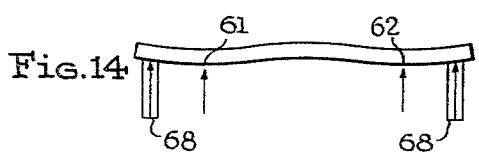

If the loadings 68 and 69 are correlated in the manner previously discussed in connection with FIG. 9, the valve plate will deflect as shown in FIG. 14. Since the moment arms of loadings 68 about axis 55 are longer than the moment arms of reactions (R) in FIG. 11, the loadings 68 will be more effective in reducing the bending moment and consequently the deflection of the valve plate. In FIG. 14, it can also be seen that the valve plate is held out of contact with the housing at points 61 and 62. This results from the fact that when the housing deflects the O-rings 65, rather than the valve plate itself, will follow and thus this embodiment insures that the loadings 68, which are analogous to the reactions (R) in FIGS. 7-11, will always be applied at the opposite ends of axis 56. In this way, the optimum compromise between mass and flow restriction can be effected.

In the preceding discussion, the inlet and discharge sides of the valve plate have been treated in the same way because the pump is reversible. It will be obvious, however, that the O-rings and leakage grooves on the rear face of the valve plate need be used only on the high pressure side of the valve plate, since it is through this side that the significant loads are transmitted.

Summarizing, the invention provides a ported valve plate mounted freely between the cylinder barrel and the housing and having a resilient O-ring surrounding the high pressure port on its rear face. Since the O-ring can expand to follow deflections of the housing and maintain sealing between the housing and the valve plate, the housing need not be thick and strong because its deflections will not affect the fluid seals on either face of the valve plate. The O-ring, in addition to insulating the valve plate from the deflections of the housing, also defines a pressure surface on the rear face of the valve plate which is so located, shaped and dimensioned relatively to the pressure area on the front face that the mass of the valve plate can be reduced to a minimum without unduly restricting the flow of high pressure fluid. The modified version of the invention illustrates a way of assuring the optimum compromise between flow restriction and valve plate mass regardless of the nature of the deflections of the housing.

As stated previously, the drawings and description relate only to a preferred embodiment of the invention. Since many changes in the structure of this embodiment can be made without departing from the inventive idea, the following claims should provide the sole measure of the scope of the invention.

What is claimed is:

1. In an engine of the type including a housing having a stationary wall containing high and low pressure ports, a rotary cylinder barrel supported within the housing for movement along the axis of rotation and provided with and end face containing a circumferential series of working chamber ports, and means exerting a biasing force on the cylinder barrel urging it toward the housing wall, the improvement which comprises a valve plate mounted freely between the cylinder barrel and the housing wall; means preventing rotation of the valve plate; a front face on the valve plate adjacent the end face of the cylinder barrel and containing arcuate high and low pressure ports arranged symmetrically about an axis and positioned to register sequentially with each working chamber port as the barrel rotates; a pressure land surrounding the high pressure port on the front face for supporting a fluid film that exerts a pressure force, the area of the land being so selected that the pressure force acting thereon is not greater than the biasing force; a rear face on the valve plate adjacent the housing wall and containing arcuate high and low pressure ports communicating respectively with the high and low pressure ports on the front face and registering with the corresponding ports in the housing wall; a resilient O-ring surrounding the high pressure port on the rear face and defining a main pressure area on which pressure from the high pressure port develops a first pressure force, the center of pressure of this area being radially and circumferentially aligned with the center of pressure of the high pressure port and surrounding land on the front face; auxiliary pressure areas located on the rear face of the valve plate along said axis about which the arcuate high and low pressure ports are symmetrical; means establishing continuous communication between the high pressure ports and the auxiliary pressure areas, whereby second pressure forces are developed on these areas; and a resilient O-ring surrounding each auxiliary pressure area, the main and auxiliary areas being so dimensioned that the sum of the first and second pressure forces acting thereon is not greater than the force acting on the pressure land.

2. The improvement defined in claim 1 in which there are two diametrically opposed auxiliary pressure areas, each being located adjacent the outer periphery of the valve plate.

References Cited in the file of this patent

UNITED STATES PATENTS

| | | |
|---|---|---|
| 1,867,308 | Durner | July 12, 1932 |
| 2,298,850 | Vickers | Oct. 13, 1942 |
| 2,313,407 | Vickers et al. | Mar. 9, 1943 |
| 2,397,314 | Grosser | Mar. 26, 1946 |
| 2,483,856 | Temple | Oct. 4, 1949 |
| 2,525,498 | Naylor et al. | Oct. 10, 1950 |
| 2,646,754 | Overbeke | July 28, 1953 |
| 2,716,945 | Presnell | Sept. 6, 1955 |
| 2,728,301 | Lindberg | Dec. 27, 1955 |
| 2,735,407 | Born | Feb. 21, 1956 |
| 2,804,828 | Grad | Sept. 3, 1957 |
| 2,809,594 | Orshansky | Oct. 15, 1957 |
| 2,813,493 | Aspelin | Nov. 19, 1957 |
| 2,847,984 | Gallant | Aug. 19, 1958 |

FOREIGN PATENTS

| | | |
|---|---|---|
| 779,670 | Great Britain | July 24, 1957 |